US006602819B2

(12) United States Patent
Coulson et al.

(10) Patent No.: US 6,602,819 B2
(45) Date of Patent: Aug. 5, 2003

(54) PROCESS FOR THE REDUCTION OF CARBON MONOXIDE AND CARBONYL SULFIDE EMISSIONS

(75) Inventors: Dale R Coulson, Wilmington, DE (US); Kostantinos Kourtakis, Swedesboro, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 43 days.

(21) Appl. No.: 09/754,609

(22) Filed: Jan. 4, 2001

(65) Prior Publication Data
US 2002/0122761 A1 Sep. 5, 2002

Related U.S. Application Data
(60) Provisional application No. 60/174,550, filed on Jan. 5, 2000.

(51) Int. Cl.[7] .................................................. B01J 23/00
(52) U.S. Cl. .................. 502/300; 502/303; 502/304; 502/305; 502/313; 502/317; 502/319; 502/325; 502/330; 502/344; 502/506; 502/514
(58) Field of Search ................... 502/300, 303, 502/304, 305, 313, 317, 319, 325, 330, 344, 514, 506, 439; 423/244.1, 247

(56) References Cited

U.S. PATENT DOCUMENTS

| 2,446,181 A | | 8/1948 | Kraus ........................ 183/115 |
| 2,701,179 A | | 2/1955 | McKinney ..................... 23/87 |
| 3,422,167 A | * | 1/1969 | Bowman et al. .............. 264/0.5 |
| 3,591,333 A | | 7/1971 | Carlson et al. ................. 23/87 |
| 3,883,636 A | | 5/1975 | Cole et al. ..................... 423/74 |
| 4,961,911 A | | 10/1990 | Reis et al. ..................... 423/72 |
| 5,270,027 A | * | 12/1993 | Balducci et al. ............. 423/338 |
| 5,585,078 A | | 12/1996 | Reis et al. ..................... 423/74 |
| 5,849,256 A | | 12/1998 | Deeba et al. ................ 423/247 |
| 5,851,947 A | | 12/1998 | Hair et al. ................... 502/258 |
| 6,271,169 B1 | * | 8/2001 | Kourtakis et al. ........... 502/305 |
| 2001/0046942 A1 | * | 11/2001 | Kourtakis et al. ........... 502/319 |

FOREIGN PATENT DOCUMENTS

| EP | 0 272 979 A1 | * | 6/1988 | .............. 423/244.1 |
| WO | 98/13329 | * | 4/1998 | |

OTHER PUBLICATIONS

David A. Ward and Edmond I. Ko, Preparing Catalytic Materials by the Sol—Gel Method, Ind. Eng. Chem. Res. 1995, vol. 34, pp. 421–433.

* cited by examiner

Primary Examiner—Stanley S. Silverman
Assistant Examiner—Timothy Vanoy

(57) ABSTRACT

Carbon monoxide and carbonyl sulfide emissions are reduced in manufacturing processes, including titanium tetrachloride production processes. Gas contaminated with CO and COS, and an oxygen-containing gas, is contacted with a suitable catalyst. The catalyst may be a metal oxide catalyst containing bismuth, cobalt and nickel, such as metal oxides containing oxides of the formula, $(Bi_a Co_b Ni_c)_y Mo_{1-y} O_z$, where a, b and c are from 0 to 1, y is from 0.01 to 0.75 and z is from 1.125 to 4.875; a xerogel or aerogel catalyst containing Au, Rh, Ru and Co in aluminum oxide/oxyhydroxide matrices, such as those of the formula $[(Au_{1-(w+d)}Rh_w Ru_d)_e Co_f AlO_{1.5-u}(OH)_{2u}]_{1-(e+f)}$, where w and d are from 0 to 1, e is from 0.001 to 0.2, f is from 0 to 0.2 and u is from 0 to 1.5; or a supported metal catalyst that contains at least one metal from the group Pd, Rh, Ru and Cu. In the latter case, the catalyst support contains alumina or carbon. A catalyst composite of Au, Rh, Ru and Cr, and cerium oxide and lanthanum oxide may also be used, such as a composites containing Au, Rh, Ru and Cr, and cerium oxide and lanthanum oxide of the formula $(Au_{1-(w+d)}Rh_w Ru_d)_e Cr_f(Ce_g La_{1-g})_{1-(e+f)}O_v$, where w and d are from 0 to 1, e is from 0.001 to 0.2, f is from 0 to 0.2, g is from 0 to 1 and v is from 1.1 to 2.4.

8 Claims, No Drawings

PROCESS FOR THE REDUCTION OF CARBON MONOXIDE AND CARBONYL SULFIDE EMISSIONS

This application claims the benefit of U.S. Provisional Application No. 60/174,550, filed Jan. 5, 2000.

FIELD OF THE INVENTION

This invention relates to a process for reducing carbon monoxide (CO) and carbonyl sulfide (COS) emissions.

BACKGROUND

A process for chlorinating titanium-containing materials in a fluidized bed reactor is known. Suitable processes are disclosed in patents U.S. Pat. Nos. 2,446,181; 2,701,179; 3,591,333; and 3,883,636. In such processes, chlorine, particulate coke, particulate titanium-bearing materials, chlorine and optionally oxygen or air, wherein at least one of these contains sulfur, are fed into a fluidized bed reactor under conditions which chlorinate the titanium and many of the other metallic impurities. Gaseous titanium tetrachloride, other metallic chlorides, carbon monoxide (CO), carbonyl sulfide (COS), carbon dioxide ($CO_2$) and other gaseous products exit the fluidized bed reactor. The gaseous titanium tetrachloride produced can then be separated from the other metal chlorides and impurities and oxidized to titanium dioxide, a white pigment, or further processed to produce titanium metal.

Details of fluidized bed processes for chlorinating titanium containing materials are disclosed in U.S. Pat. No. 5,585,078 ('078). The '078 patent also discloses and claims a process for reducing the emissions of CO and COS from the fluidized bed reactor effluent. The emission reduction process involves introducing an oxygen containing gas into at least one location which is downstream of the surface of the fluidized bed, as measured in its static condition, with the oxygen containing gas being introduced in an amount to convert at least some of the COS and CO to $CO_2$ and $SO_2$ which reduces CO and COS emissions. In the example given in the '078 patent, the CO emitted from the fluidized bed chlorinator was reduced by 36.7%, and the COS was reduced by 92.5%.

In the titanium chlorination process, it is desirable to convert COS to $SO_x$, where x is 2 or 3, and CO to $CO_2$, because environmental requirements often require low levels of emissions for CO and COS. However, as stated in U.S. Pat. No. 4,961,911, while means are known to reduce the amount of carbon monoxide emitted, they involve addition of compounds which can be undesirable in the titanium dioxide pigment or in the process to make such pigment.

Carbonyl sulfide (COS) is known to be a fairly inert chemical compound. Furthermore, carbonyl sulfide is a known poison for many supported metal oxidation catalysts. Because of the above, catalytic oxidation of CO in the presence COS is a difficult problem.

There is a need for an efficient catalytic process for the oxidation of carbon monoxide to carbon dioxide in the presence of carbonyl sulfide and also to simultaneously oxidize-carbonyl sulfide to sulfur oxides.

SUMMARY OF THE INVENTION

This invention provides a process for reducing carbon monoxide and carbonyl sulfide emissions which are produced in a process for chlorinating titanium containing material in a fluidized bed reactor which evolves gaseous material including CO, COS and $TiCl_4$. The process comprises contacting a gaseous material comprising CO, COS or $TiCl_4$ and a gas comprising oxygen with a catalyst selected from the group consisting of (a) metal oxides comprising oxides of the formula, $(Bi_aCo_bNi_c)_yMo_{1-y}O_z$, where a, b and c are from 0 to 1, y is from 0.01 to 0.75 and z is from 1.125 to 4.875; (b) a xerogel or aerogel, comprising Au, Rh, Ru and Co in aluminum oxide/oxyhydroxide matrices, of the formula $[(Au_{1-(w+d)}Rh_wRu_d)_eCo_fAlO_{1.5-u}(OH)_{2u}]_{1-(e+f)}$, where w and d are from 0 to 1, e is from 0.001 to 0.2, f is from 0 to 0.2 and u is from 0 to 1.5; (c) composites comprising Au, Rh, Ru and Cr, and cerium oxide and lanthanum oxide of the formula $(Au_{1-(w+d)}Rh_wRu_d)_eCr_f(Ce_gLa_{1-g})_{1-(e+f)}O_v$, where w and d are from 0 to 1, e is from 0.001 to 0.2, f is from 0 to 0.2, g is from 0 to 1 and v is from 1.1 to 2.4; and (d) a supported metal comprising at least one metal selected from the group consisting of Pd, Rh, Ru and Cu, wherein said support is selected from the group consisting of alumina and carbon, wherein said metal is present from about 0.01 to 20 weight percent of the catalyst weight; at a temperature of from about 250° C. to about 500° C. to produce $CO_2$ and $SO_x$, where x is 2 or 3.

The present invention also discloses a composition of matter, comprising Au, Rh, Ru and Cr, and cerium oxide and lanthanum oxide of the formula $(Au_{1-(w+d)}Rh_wRu_d)_eCr_f(Ce_gLa_{1-g})_{1-(e+f)}O_v$, where w and d are from 0 to 1, e is from 0.001 to 0.2, f is from 0 to 0.2, g is from 0 to 1 and v is from 1.1 to 2.4.

A further disclosure of the present invention is a product made by the process comprising the steps of: (i) dissolving precursor salts selected from the group consisting of Au, Rh, Ru, Ce, Cr and La in a solvent to form a solution or fine colloid; (ii) rapidly freezing the solution by immersing into a suitable medium to form a frozen solid; (iii) transferring the frozen solid to a freeze drying chamber maintained at a temperature ranging from about 0° C. to about −40° C. with a vacuum of from about 0.3 Pa to about 1.3 Pa until freeze-drying is complete; and optionally; (iv) heating the solid in air at a temperature ranging from about 250° C. to about 600° C. for a time sufficient to decompose the precursors.

DETAILED DESCRIPTION

In a typical titanium tetrachloride manufacturing process, titanium-containing material, carbonaceous material, chlorine, and optionally oxygen or air, wherein at least one of these reactants contains sulfur, are fed into a fluidized bed reactor. The titanium containing material can be any suitable titanium containing source material, such as titanium containing ores including rutile, ilmentite or anatase ore; beneficiates thereof; titanium containing by-products or slags; and mixtures thereof. Any carbonaceous material which has been subjected to a coking process or is substantially free of hydrogen is suitable for use in the titanium manufacturing process.

Gaseous reaction products from the fluidized bed reactor are cooled in stages to first condense and remove metal chlorides other than titanium tetrachloride, such as iron chloride. The remaining product from the reactor is then cooled to condense titanium tetrachloride leaving a non-condensable exhaust gas stream comprising COS and CO.

Since the catalysts of this invention are reactive to CO and COS, catalysts are useful for emissions derived from any process for the reaction or abatement of CO, COS, and mixtures thereof.

In the present process, the exhaust gas stream comprising COS and CO is oxidized to $CO_2$ and $SO_x$ with an oxygen containing gas, where x is 2 or 3, in the presence of a heterogeneous catalyst in a fixed bed reactor.

The catalysts useful in the process of the present invention can be prepared by a variety of known art methods such as impregnation, including variants such as ion-exchange, deposition and grafting; xerogel or aerogel formation; and freeze-drying. Other synthetic methods such as spray roasting or co-precipitation can also be employed. The catalysts of the present invention can be used in the form of granules, powder or pellets.

The impregnation technique typically comprises contacting the support with a solution of a compound of the catalytically active material or a solution of compounds of the catalytically active materials. The contacting is followed by drying and calcining the supported materials.

The xerogels or aerogels used in this invention typically comprise a matrix material which is derived from a solution of the matrix component(s) and which incorporates the active catalyst component(s) which is obtained from a dissolved component(s). A matrix is a skeletal framework of oxides and oxyhydroxides prepared by the hydrolysis and condensation of alkoxides and other reagents. The framework typically comprises 30% or more, by weight, of the total catalyst composition. The matrix material typically comprises aluminum, oxide/hydroxide xerogels or aerogels or mixtures thereof totaling from 99.9 to 30 mole %, preferably from 65 to 95 mole % of the catalyst composition.

The sol-gel process for the preparation of xerogels and aerogels involves mixing reactive monomers into a solution. The monomers are polymerized producing a highly cross-linked three-dimensional solid network gel. The composition, pore and primary particle sizes, gel time, surface areas, and density may be adjusted and controlled by the solution chemistry. The gels are then processed by either supercritical extraction or controlled slow evaporation of the liquid phase from the gel. Supercritical extraction of the gels results in a highly porous skeletal structure which is a low density aerogel. Controlled slow evaporation of the liquid phase from the gels results in a xerogel, which may be of high density. A detailed description of the great variety of synthetic procedures that can be used to prepare the xerogel and aerogel catalysts of this invention can be found in D. A. Ward et al. "Preparing Catalytic Materials by the Sol-Gel Method," *Ind Eng. Chem. Res.* 1995, 34, 421–433.

In a preferred embodiment of the process of this invention, pre-formed colloidal sols in water, or aquasols, are used to prepare the xerogel or aerogel catalysts. The aquasols are comprised of colloidal particles ranging in size from 2 to 50 nm. In general, the smaller primary particle sizes (2 to 5 nm) are preferred. The pre-formed colloids contain from 10 to 35 weight percent of colloidal oxides or other materials, depending on the method of stabilization. Generally, after addition of the active (for the partial oxidation reactions, either as a catalyst or promoter) metal components, the final de-stabilized colloids can possess from about 1 to about 35 wt. % solids, preferably from about 1 wt. % to 20 wt. %.

Removal of solvent from the gels can be accomplished by several methods as described above to prepare either an aerogel or xerogel.

With respect to catalyst family (c) of the process of the present invention, catalyst composites comprising Au, Rh, Ru and Cr, and cerium oxide and lanthanum oxide of the formula $(Au_{1-(w+d)}Rh_wRu_d)_eCr_f(Ce_gLa_{1-g})_{1-(e+f)}O_v$, where w and d are from 0 to 1, e is from 0.001 to 0.2, f is from 0 to 0.2, g is from 0 to 1 and v is from 1.1 to 2.4, were prepared by a freeze drying technique. Freeze drying procedures can accommodate several catalyst compositions, and are useful if the catalyst precursors are soluble in water or another solvent which can be rapidly frozen. Precursor salts are dissolved in the appropriate amount of solvent to form a solution or fine colloid. In a typical embodiment of the present invention, water soluble salts of Au, Rh, Ru, Cr, Ce, and La (for example, $AuCl_4$, $RhCl_3$, $RuCl_3$, $Cr(NO)_3$, $Ce(NO_3)_3$ and $La(NO_3)_3$) are dissolved in water prior to freeze drying. Other water soluble salts of Au, Rh, Ru, Ce, Cr and La can be used (e.g., acetates, acetylacetonates, hydroxyacetates, chlorides, nitrates, nitrites can be used. Colloids of cerium oxide (e.g., $CeO_2$ colloids), lanthanum oxide, or metal colloids containing Au, Rh, Ru, or Cr, can be used also. Solution formation is preferable, but not required. Other solvent systems can be used, if they can be frozen. The solution is then rapidly frozen by immersion in a suitable medium, such as liquid nitrogen. If the solution is rapidly frozen (less than about 15 seconds), the salts and other components will remain intimately mixed and, in most cases, will not segregate to any significant degree. The frozen solid is transferred to a freeze drying chamber.

Freeze drying procedures can accommodate several catalyst compositions and are useful if the catalyst precursors are soluble in water or another solvent which can be rapidly frozen. Precursor salts are dissolved in the appropriate amount of solvent to form a solution or fine colloid. The frozen solid is transferred to a freeze drying chamber and the same procedures, as described immediately below, is followed.

Refrigerated shelves are used to prevent melting of the frozen material. The freeze drier can be maintained at a temperatures ranging from about 0° C. to about −40° C., preferably between −40° C. to about −20° C. with a vacuum of 2–10 millitorr (0.3 Pa–1.3 Pa). After at least about 24 hours, preferably about 2–4 days, the dried sample can be calcined (heated) in air at a temperature ranging from about 250° C. to about 600° C., preferably about 350° C. to about 525° C., for a time sufficient to decompose the precursors.

The solution concentrations used in the freeze drying, spray drying and spray roasting experiments (latter two described below) can vary widely, and can range from 0.1 M to 10 M, depending on the solubility of the precursor salts used. After freezing, solutions are evacuated for a period of day(s) to week (s), depending on the quantity of solvent removed. In addition to ex situ calcination indicated above, catalyst can also be calcined in situ (in the reactor) to produce the final, active form. Catalyst precursor solutions can be soaked, added or impregnated into porous catalyst monoliths and supports, frozen, dried, or dried under various atmospheres and calcined as described above.

For catalyst families (a), (b), and (c) described in the process of the present invention, the catalyst precursors can be spray dried to produce powders. Spray drying procedures involve the use of solutions, colloids or slurries containing catalyst precursors or catalyst compounds. The technique consists of atomizing these liquids (usually but not exclusively aqueous) into a spray, and contact between the spray and the drying medium (usually hot air) which results in moisture evaporation. The drying of the spray proceeds until the desired amount of moisture in the particles is obtained, and the product is recovered by suitable techniques (usually cyclone separation). A detailed description of the spray drying methods can be found in "Spray Drying Handbook", 4th edition by K. Masters (Longman Scientific and Technical, John Wiley and Sons, N.Y.) c. 1985.

Spray roasting involves the use of solutions or colloids, but generally involves drying and calcination (at higher temperatures) in a single process step to produce catalyst powders.

The amount of oxygen-containing gas should be sufficient to convert the exhaust gas stream comprising COS and CO to $CO_2$ and $SO_x$, where x is 2 or 3. Typically, the amount of oxygen-containing gas used will be about the stoichiometric amount for the complete conversion of the COS and CO. The ratio of oxygen in the oxygen-containing gas to CO will be from about 0.5:1 to about 5.0:1, preferably from about 0.75:1 to about 1.0:1. The ratio of oxygen in the oxygen-containing gas to COS will be about from 1.5:1 to about 100:1, preferably from about 15:1 to about 30:1.

Both air and oxygen are suitable oxygen-containing gases. Other suitable oxygen-containing gases are those which include, naturally or by addition, suitable amounts of air or oxygen, such as gas evolved from a process to oxidize $TiCl_4$ to $TiO_2$, nitrogen and combustion gas.

The sulfur dioxide and sulfur trioxide oxidation products can readily be scrubbed by known means. Release of the carbon dioxide oxidation product is generally not considered an environmental problem.

Generally, if the process temperature is too low, no or low conversion of reactants to $CO_2$ and $S_2/SO_3$ will result. Increases in process temperatures will ordinarily increase catalytic activity, however, if temperatures are excessively high, catalyst deactivation can occur. Preferably, reaction temperatures are maintained between about 250° C. and about 500° C., more preferably about 300° C. to about 400° C., with lower temperatures within the ranges essentially preferred in order to minimize catalyst deactivation. The oxidation reaction can be done at atmospheric or superatmospheric pressures.

Without further elaboration, it is believed that one skilled in the art can, using the preceding description, utilize the present invention to its fullest extent. The following embodiments are, therefore, to be construed as merely illustrative, and are not to limit the remainder of the invention in any way whatsoever.

EXAMPLES

General

For the catalyst tests a ¼" (0.64 cm)×9" (22.9 cm) reactor was loaded with a fixed volume (0.625 cc) of catalyst (with silica wool used to hold it in place) and was heated to the initial reaction temperature (300° C.) under nitrogen. The gas feed system was configured to deliver a mixture of the simulated waste gas (CO, 4.5% and COS, 0.18%); and $O_2$ (3.5%); with the balance $N_2$) to the reactor at a constant flow rate of 20.9 cc/min. and one atmosphere pressure. Prior to taking a reaction sample, a sample of the unreacted feed gas was taken to establish the gas composition. Analysis of the gas mixture was by a gas chromatograph (GC) containing a thermal conductivity detector. The column used was a combination of a 10' (304.8 cm)×⅛" (0.32 cm) stainless steel 60/80 mesh (0.25/0.18 mm) Molecular Sieve 13× column (used to separate $O_2$, $N_2$ and CO) and a 2' (61 cm)×⅛" (0.32 cm) stainless steel 80/100 mesh (0.18/0.15 mm) Haysep® (a co-polymer of divinylbenzene and N-vinyl-2-pyrollidone) column (used to separate $H_2O$ and $CO_2$). Helium was used as a carrier gas for all columns. Analyses on the column systems was carried out using samples taken from a 500 microliter sample loop. The GC was programmed to control the column temperatures in a manner such that a total analysis could be completed in 15.45 minutes.

The response factors for the compounds of interest were determined using sample loop injections of gases from standardized purchased mixtures.

Following the analysis of feed gases, samples of reacted gases are taken at each of three temperatures (300° C., 400° C., 500° C.) and analyzed as before. The test was completed by taking a final feed gas sample for analysis. The data was then compiled and calculations carried out to determine the % conversion of COS, $O_2$ and CO and the selectivities to $CO_2$.

Results of catalyst testing for Examples 1 to 14 are shown in Table 1. Results of catalyst testing for Comparative Examples A to E are shown in Table A. In both tables, CT represents contact time.

Example 1

Commercially available $CuCl_2$ supported on $Al_2O_3$, obtained from the Harshaw Chemical Company, Cleveland Ohio (Cu-095, E-156-1-2) of nominal composition 3.61 wt. % Cu (as $CuCl_2$) supported on $Al_2O_3$ was used.

Example 2

Alpha-alumina spheres (2 g) were slurried into a small volume (1 mL) of acetone containing dissolved rhodium tris-(2,4-pentanedionate) (80 mg). The solvent was evaporated and the particles were dried in flowing nitrogen at 100° C. for 40 minutes followed by another 4 hours at 200° C. The sample was then heated to 600° C. for 1 hour at which point the gas flow was switched to hydrogen at 600° C. and held for 4 hours. The sample was then cooled in nitrogen flow and collected for testing. The nominal composition was 1% Rh on alpha-alumina

Example 3

The catalyst was prepared in the same manner as that of Example 2 except that 160 mg of rhodium tris-(2,4-pentanedionate) was used. The nominal composition was 2% Rh on alpha-alumina.

Example 4

The catalyst was prepared in the same manner as that of Example 2 except that the weights were scaled by a factor of 5. The nominal composition was 2% Rh on alpha-alumina.

Example 5

The catalyst was prepared in the same manner as that of Example 3 except that 10 g of alpha-alumina, 200 mg of rhodium tris-(2,4-pentanedionate) and 3 mL of acetone were used. The nominal composition was 0.5% Rh on alpha-alumina.

Example 6

Alpha-alumina foamed monolith (1 g, 12 mm dia.×10 mm thick; 80 pores per inch) was placed in a Teflon® poly (tetrafluoroethylene) beaker. A small volume (1 mL) of acetone containing dissolved rhodium tris-(2,4-pentanedionate) (20 mg) was slowly dripped onto this monolith. The solvent was evaporated and the monolith was then dried in flowing nitrogen at 100° C. for 40 minutes followed by another 4 hours at 200° C. The sample was then heated to 600° C. for 1 hour at which point the gas flow was switched to hydrogen at 600° C. and held for 4 hours. The sample was then cooled in nitrogen flow and collected for testing. The nominal composition was 0.5 wt % Rh on alpha-alumina monolith.

Example 7

The catalyst was a commercially available sample of 0.5% $Pd/Al_2O_3$ obtained from Girdler.

Example 8

An aqueous solution of $(NH_4)_6Mo_7O_{24} \cdot 4H_2O$, (7.2 mL, 1.75 M) was combined with aqueous $Bi(NO_3)_3 \cdot 9H_2O$ (33.6 mL, 0.5 M in 1 M $HNO_3$), aqueous $NiCl_2 \cdot 6H_2O$ (2.1 mL, 1 M), and aqueous $Co(NO_3)_2 \cdot 6H_2O$ (2.1 mL, 1 M) in a 150 mL petri dish, which was continuously agitated. The entire solution was rapidly frozen with liquid nitrogen and dried as a frozen solid under vacuum for several days to produce a freeze dried powder. The freeze dried material was heated in air at 450° C. for 5 hours prior to pelletization and use in a microreactor. The nominal composition was $Mo_{0.375}Bi_{0.5}Co_{0.0625}Ni_{0.0625}$.

Example 9

An aqueous ruthenium trichloride (11.777 mL, 0.5 M) solution, aqueous cobalt chloride $CoCl_2$ solution (11.777 mL, 1 M) and colloidal alumina (21.445 mL, 4.668 M) were simultaneously combined with continuous agitation in a 150 mL petri dish. In a subsequent step, concentrated HCl (5 mL, 0.1 M) was added to destabilize the colloid and induce gelation. A gel point was realized, and a black gelatinous material formed. The material was aged for 24 hours and dried at 120° C. under vacuum for 5 hours prior to use. The nominal composition was $Ru_{0.05}Co_{0.1}(AlO_{1.5-x}(OH)_{2x})_{0.85}$.

Example 10

An aqueous $AuCl_3$ solution (30.865 mL, 0.03 M) was added to an aqueous solution of $Cr_3(OH)_2(CH_3COO)_7$ (2.193 mL, 1.6891 M) and colloidal alumina (6.943 mL, 4.668 M) in a petri dish with continuous agitation. The final pH of the mixture was 2.28. The colloid spontaneously de-stabilized with the addition of the chromium and gold salts. A gel point was realized; a red-brown material formed, and was dried at 120° C. in vacuum for 5 hours prior to use. The nominal composition was $Au_{0.025}Cr_{0.1}(AlO_{1.5-x}(OH)_{2x})_{0.875}$.

Example 11

A $RhCl_3$ (6.943 mL, 0.02 M) in 6 M HCl solution was combined with aqueous $Ce(NO_3)_3 \cdot 6H_2O$ (38.057 mL, 0.7261 M) in a 150 ml petri dish with continuous agitation. The entire solution was rapidly frozen with liquid nitrogen and dried as a frozen solid under vacuum for several days to produce a freeze dried powder. The freeze dried material was heated in air at 350° C. for 5 hours, and then at 525° C. for 1 hour prior to pelletization and use in a microreactor. The nominal composition was $Rh_{0.005}Ce_{0.995}$.

Example 12

An aqueous $RuCl_3$ solution (20.914 mL, 0.1 M), an aqueous $CoCl_2$ solution (8.366 mL, 1 M) and colloidal alumina (6.720 mL, 4.668 M) were combined in a 150 mL petri dish with gentle swirling. In a second step, a 0.1 M HCl solution (4 mL) was added to destabilize the colloid. A dark brown gel formed. The material was aged for at least 24 hours and dried under vacuum at 120° C. for 5 hours prior to use. The nominal composition was $RuCl_3{(0.05)}CoCl_2{(0.2)}AlO_{1.5(0.75)}$.

Example 13

An aqueous $RuCl_3$ solution (25.586 mL, 0.1 M) and colloidal alumina (10.414 mL, 4.668 M) were combined in a 150 mL petri dish with gentle swirling. In a second step, 0.1 M HCl solution (4 mL) was added to destabilize the colloid. A dark brown gel formed. The material was aged for at least 24 hours and dried under vacuum at 120° C. for 5 hours prior to use. The nominal composition was $RuCl_3{(0.05)}AlO_{1.5(0.95)}$.

Example 14

A commercially available catalyst of nominal composition, 2.06 wt. % Ru/2.37 wt. % Pd/Ru/C was used. The material was; manufactured by Engelhard, Lot S-650, Pd and 2.5 wt % Ru on carbon granules.

Comparative Example A

The catalyst was prepared in the same manner as that of Example 3 except that 10 g of alpha-alumina, 80 mg of rhodium tris-(2,4-pentanedionate) and 3 mL of acetone were used. The nominal composition was 0.19% Rh on alpha-alumina.

Comparative Example B

The catalyst was a commercial sample of Guignet's Green $Cr_2O_3$, available from Pfizer.

Comparative Example C

A commercial sample of SiC, available from Aggco Corporation, was washed in aqueous $HNO_3$ before use, and sieved on −40, +60 mesh (−0.42, +0.25 mm) screens prior to use.

Comparative Example D

A commercial sample of fumed $SiO_2$, available from Degussa Chemical Co. was granulated and sieved on −40, +60 mesh (−0.42, +0.25 mm) screens prior to use.

Comparative Example E

A commercial sample of $Al_2O_3$ available from Degussa Chemical Co. was granulated and sieved on −40, +60 mesh (−0.42, +0.25 mm) screens prior to use.

TABLE 1

| EX. | Cat. | Wt. g | T ° C. | CT s | % $O_2$ Conv. | % COS Conv. | % CO Conv. | % $CO_2$ Sel. |
|---|---|---|---|---|---|---|---|---|
| 1 | $CuCl_2/Al_2O_3$ | 0.56 | 301 | 0.63 | 79.7 | 100 | 100 | 114.5 |
|   |   |   | 400 | 0.54 | 81.5 | 100 | 100 | 113.8 |
|   |   |   | 500 | 0.47 | 89.4 | 100 | 100 | 113.7 |
| 2 | 1% $Rh/Al_2O_3$ | 0.48 | 298 | 0.66 | 2.8 | 100 | 0.8 | 0.0 |
|   |   |   | 348 | 0.61 | 73.2 | 100 | 98.1 | 102.9 |
|   |   |   | 393 | 0.56 | 76.9 | 100 | 100 | 112.7 |
|   |   |   | 494 | 0.49 | 77.2 | 100 | 100 | 112.8 |

TABLE 1-continued

| EX. | Cat. | Wt. g | T °C. | CT s | % O$_2$ Conv. | % COS Conv. | % CO Conv. | % CO$_2$ Sel. |
|---|---|---|---|---|---|---|---|---|
| 3 | 2% Rh/Al$_2$O$_3$ | 0.44 | 300 | 0.92 | 4.8 | 100 | 2.1 | 0.0 |
|   |   |   | 398 | 0.79 | 76.9 | 100 | 100 | 112.7 |
|   |   |   | 497 | 0.69 | 77.0 | 100 | 100 | 113.1 |
| 4 | 2% Rh/α-Al$_2$O$_3$ | 0.45 | 300 | 0.84 | 3.9 | 34.8 | 6.4 | 13.9 |
|   |   |   | 325 | 0.80 | 73.2 | 100 | 98.4 | 100.5 |
|   |   |   | 397 | 0.72 | 76.6 | 100 | 100 | 86.4 |
|   |   |   | 496 | 0.63 | 77.8 | 100 | 100 | 87.0 |
| 5 | 0.5% Rh/α-Al$_2$O$_3$ | 0.47 | 301 | 1.06 | 4.6 | 31.2 | 6.0 | 6.8 |
|   |   |   | 350 | 0.98 | 73.2 | 100 | 98.1 | 102.9 |
|   |   |   | 398 | 0.91 | 76.7 | 100 | 100 | 86.6 |
|   |   |   | 497 | 0.79 | 77.2 | 100 | 100 | 88.1 |
| 6 | 2% Rh/Monolith | 0.25 | 302 | 0.91 | 1.6 | 11.9 | 6.0 | 0.0 |
|   |   |   | 350 | 0.83 | 72.7 | 100 | 97.8 | 103.3 |
|   |   |   | 399 | 0.78 | 76.3 | 100 | 100 | 86.2 |
|   |   |   | 498 | 0.68 | 76.8 | 100 | 100 | 87.6 |
| 7 | 0.5% Pd/Al$_2$O$_3$ | 0.46 | 300 | 0.83 | 41.8 | 100 | 54.2 | 93.1 |
|   |   |   | 399 | 0.71 | 76.6 | 100 | 100 | 114.2 |
|   |   |   | 496 | 0.62 | 77.8 | 100 | 100 | 114.7 |
| 8 | Mo$_{0.375}$Bi$_{0.5}$Co$_{0.0625}$Ni$_{0.0625}$ | 0.55 | 300 | 0.90 | 81.3 | 100 | 68.7 | 125.4 |
|   |   |   | 400 | 0.76 | 98.8 | 100 | 100 | 123.5 |
|   |   |   | 499 | 0.67 | 98.7 | 100 | 100 | 128.3 |
| 9 | Ru$_{0.05}$Co$_{0.1}$(AlO$_{1.5-x}$(OH)$_{2x}$)$_{0.85}$ | 0.79 | 300 | 0.85 | 68.7 | 100 | 100 | 82.2 |
|   |   |   | 400 | 0.72 | 100 | 100 | 100 | 102.2 |
|   |   |   | 499 | 0.63 | 100 | 100 | 100 | 113.7 |
| 10 | Au$_{0.025}$Cr$_{0.1}$(AlO$_{1.5-x}$(OH)$_{2x}$)$_{0.875}$ | 0.70 | 300 | 0.84 | 88.5 | 100 | 73.4 | 125.5 |
|   |   |   | 400 | 0.72 | 100 | 100 | 100 | 127.2 |
|   |   |   | 499 | 0.63 | 100 | 100 | 100 | 133.2 |
| 11 | Rh$_{0.005}$Ce$_{0.995}$ | 0.90 | 300 | 0.91 | 75.3 | 100 | 100 | 106.0 |
|   |   |   | 400 | 0.77 | 75.1 | 100 | 100 | 105.8 |
|   |   |   | 496 | 0.68 | 75.8 | 100 | 100 | 105.4 |
| 12 | RuCl$_{3(0.05)}$CoCl$_{2(0.2)}$AlO$_{1.5(0.75)}$ | 0.66 | 300 | 0.65 | 3.3 | 3.9 | 3.8 | 65.6 |
|   |   |   | 398 | 0.56 | 79.1 | 100 | 99.0 | 105.2 |
|   |   |   | 496 | 0.49 | 78.0 | 100 | 100 | 105.6 |
| 13 | RuCl$_{3(0.05)}$AlO$_{1.5(0.95)}$ | 0.70 | 300 | 1.06 | 11.7 | 22.8 | 16.7 | 97.2 |
|   |   |   | 400 | 0.90 | 77.3 | 100 | 91.4 | 114.1 |
|   |   |   | 499 | 0.79 | 76.6 | 100 | 100 | 104.6 |
| 14 | 2.06 wt.% Ru/2.37 wt. % Pd/C | 0.34 | 300 | 0.85 | 25.3 | 100 | 19.4 | 75.4 |
|   |   |   | 396 | 0.73 | 100 | 100 | 100 | 140.9 |
|   |   |   | 494 | 0.64 | 100 | 100 | 100 | 143.9 |

TABLE A

| EX. | Cat. | Wt. g | T °C. | CT s | % O$_2$ Conv. | % COS Conv. | % CO Conv. | % CO$_2$ Sel. |
|---|---|---|---|---|---|---|---|---|
| A | 0.19% Rh/α-Al$_2$O$_3$ | 0.45 | 301 | 0.64 | 5.9 | 27.0 | 9.4 | 22.8 |
|   |   |   | 401 | 0.54 | 41.7 | 52.7 | 55.7 | 81.2 |
|   |   |   | 496 | 0.48 | 41.4 | 48.8 | 55.3 | 84.3 |
| B | Cr$_2$O$_3$ | 0.53 | 298 | 0.65 | 30.0 | 100 | 38.6 | 79.4 |
|   |   |   | 398 | 0.56 | 38.1 | 100 | 50.3 | 86.1 |
|   |   |   | 493 | 0.49 | 79.3 | 100 | 100 | 116.2 |
| C | SiC | — | 300 | 0.86 | 0 | 32.6 | 0.4 | 0 |
|   |   |   | 400 | 0.73 | 1.5 | 100 | 0.3 | 0 |
|   |   |   | 499 | 0.64 | 5.0 | 100 | 0 | 0 |
| D | SiO$_2$ | 0.27 | 300 | 0.84 | 0.3 | 20.6 | 0.5 | 0 |
|   |   |   | 400 | 0.72 | 3.9 | 100 | 1.7 | 0 |
|   |   |   | 499 | 0.63 | 13.5 | 100 | 10.0 | 27.0 |
| E | Al$_2$O$_3$ | 0.41 | 300 | 0.92 | 4.0 | 100 | 1.3 | 0 |
|   |   |   | 400 | 0.79 | 15.0 | 100 | 10.7 | 35.3 |
|   |   |   | 499 | 0.69 | 52.1 | 100 | 71.2 | 99.1 |

What is claimed is:

1. A composition of matter, comprising Au, Rh, Ru, Cr, cerium oxide and lanthanum oxide of the formula (Au$_{1-(w+d)}$Rh$_w$Ru$_d$)$_e$Cr$_f$(Ce$_g$La$_{1-g}$)$_{1-(e+f)}$O$_v$, where w and d are from 0 to 1, e is from 0.001 to 0.2, f is from 0 to 0.2, g is from 0 to 1 and v is from 1.1 to 2.4.

2. The composition of claim 1 in freeze dried, heat treated form.

3. A freeze-dried, heat treated composition of matter, comprising Au, Rh, Ru, Cr, cerium oxide and lanthanum oxide, made by a process comprising the steps of:
 (i) dissolving precursor salts selected from the group consisting of Au, Rh, Ru, Ce, Cr and La in a solvent to form a solution or colloid; or, optionally, combining metal or metal oxide colloids, wherein the metal is selected from the group consisting of Au, Rh, Ru, Ce, Cr and La, to form a colloid mixture; or a combination thereof;

(ii) freezing the product of step (i) to form a frozen solid;

(iii) transferring the frozen solid to a freeze drying chamber maintained at a temperature ranging from about 0° C. to about −40° C. with a vacuum of from about 0.3 Pa to about 1.3 Pa until freeze-drying is complete; and (iv) heating the solid in air at a temperature ranging from about 250° C. to about 600° C. for a time sufficient to decompose the precursors.

4. The composition of claim 3 wherein said precursor salts are selected from the group consisting of chlorides, nitrates, nitrites, acetates, acetylacetonates and hydroxyacetates.

5. The composition of claim 4 wherein said solvent is water.

6. A process for making a freeze-dried, heat treated composition of matter comprising Au, Rh, Ru, Cr, cerium oxide and lanthanum oxide, comprising the steps of:

(i) dissolving precursor salts selected from the group consisting of Au, Rh, Ru, Ce, Cr and La in a solvent to form a solution or colloid; or, optionally, combining metal or metal oxide colloids, wherein the metal is selected from the group consisting of Au, Rh, Ru, Ce, Cr and La, to form a colloid mixture; or a combination thereof;

(ii) freezing the product of step (i) to form a frozen solid;

(iii) transferring the frozen solid to a freeze drying chamber maintained at a temperature ranging from about 0° C. to −40° C. with a vacuum of from about 0.3 Pa to about 1.3 Pa until freeze-drying is complete; and (iv) heating the solid in air at a temperature ranging from about 250° C. to about 600° C. for a time sufficient to decompose the precursors.

7. The process of claim 6 wherein said precursor salts are selected from the group consisting of chlorides, nitrates, nitrites, acetates, acetylacetonates and hydroxyacetates.

8. The process of claim 7 wherein said solvent is water.

* * * * *